United States Patent
Shimada et al.

(10) Patent No.: US 7,809,755 B2
(45) Date of Patent: Oct. 5, 2010

(54) CONTENT MANAGEMENT SYSTEM AND COMPUTER READABLE MEDIUM

(75) Inventors: Toshiroh Shimada, Kanagawa (JP); Tsutomu Ishii, Kanagawa (JP); Akira Ichiboshi, Kanagawa (JP); Hajime Ueno, Kanagawa (JP); Yoko Kurihara, Kanagawa (JP); Minoru Koshimizu, Kanagawa (JP); Yasunori Saito, Kanagawa (JP); Shigehiko Sasaki, Kanagawa (JP); Masahiro Sato, Kanagawa (JP); Tomoyuki Shoya, Kanagawa (JP); Kyotaro Tomoda, Kanagawa (JP); Naoki Hayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 382 days.

(21) Appl. No.: 12/081,768

(22) Filed: Apr. 21, 2008

(65) Prior Publication Data

US 2009/0083329 A1    Mar. 26, 2009

(30) Foreign Application Priority Data

Sep. 20, 2007   (JP) ............................. 2007-243278

(51) Int. Cl.
*G06F 17/30* (2006.01)

(52) U.S. Cl. .................. 707/791; 707/802; 707/822; 707/828

(58) Field of Classification Search .......... 707/600–831
See application file for complete search history.

(56) References Cited

FOREIGN PATENT DOCUMENTS

| JP | A 2004-252494 | 9/2004 |
|---|---|---|
| JP | A 2007-26015 | 2/2007 |

*Primary Examiner*—Isaac M Woo
(74) *Attorney, Agent, or Firm*—Oliff & Berridge, PLC

(57) ABSTRACT

A content management system includes a conversion a section, a display data storing section, a field section, an operation section and a management section. The conversion section converts content data into display data which is to be written into an electronic paper. The display data storing section stores the display data. The field storing section stores field data which includes identification information of a first user belonging to a field and identification information of the display data. The operation section accepts a request from a second user. The management section that allows, when the identification information of the first user contained in the field data coincides with identification information of the second user contained in the request accepted by the operation section, the display data indicated by the identification information contained in the field data to be written into the electronic paper.

6 Claims, 6 Drawing Sheets

FIG. 3

CONTENT DB

| CONTENT ID | CONTENT NAME | ATTRIBUTE (OWNER) | CONTENT DATA (DIRECTORY) |
|---|---|---|---|
| ⋮ | ⋮ | ⋮ | ⋮ |

DISPLAY DATA

| DATA ID | CONTENT NAME | CONTENT ID | DISPLAY DATA |
|---|---|---|---|
| ⋮ | ⋮ | ⋮ | ⋮ |

FIELD DATA

| FIELD ID | OWNER ID | USER LIST (USER ID) | CONTENT LIST (CONTENT ID) | DISPLAY DATA LIST (DATA ID) | AVAILABLE PERIOD |
|---|---|---|---|---|---|
| ---- | ---- | ---- | ---- | ---- | ---- |

CONTENT MANAGEMENT SYSTEM AND COMPUTER READABLE MEDIUM

CROSS-REFERENCE TO RELATED APPLICATIONS

This application is based on and claims priority under 35 USC 119 from Japanese Patent Application No. 2007-243278 filed Sep. 20, 2007.

BACKGROUND

1. Technical Field

The present invention relates to a system for managing content employing an electronic paper, and particularly to a technique in which contents browsed by means of electronic paper in a field to which specific users belong, such as a task, a process, or a workplace may be browsed again later by the user belongs to the same field.

2. Related Art

Electronic paper which displays and retains a content image such as a document in a no-power state and which is rewritten the content image has been utilized, and the spread of the use of the electronic paper has been desired as a content display medium which is substituted for the paper sheet.

The electronic paper is divided in the form of writing the content image into various types, for example, optical write type electronic paper and electronic write type electronic paper. The optical write type electronic paper displays and retains a content image by projecting the content image by a write device, and the electronic write type electronic paper displays and retains a content image by writing the content image based on electronic data by a write device.

In any type of electronic paper, since the electronic paper is easy to carry the displayed content image, the electronic paper is useful as a medium for displaying contents in a mobile environment.

Browsing of the contents by means of the electronic paper is performed in person and also in a group having plural users. For example, in a field such as a meeting or collaboration, electronic paper on which contents are displayed is distributed to each person.

The field such as the meeting, the collaboration, the task, the process, or the workplace is an aggregate to which one or plural specified users belong. In such the field, the necessary contents are displayed on the electronic paper each time and utilized.

SUMMARY

A content management system includes a conversion a section, a display data storing section, a field section, an operation section and a management section. The conversion section converts content data into display data which is to be written into an electronic paper, the electronic paper which displays and retains an image in a no-power state and is configured to rewrite the image. The display data storing section stores the display data. The field storing section stores field data which includes identification information of a first user belonging to a field and identification information of the display data. The operation section accepts a request from a second user. The management section that allows, when the identification information of the first user contained in the field data coincides with identification information of the second user contained in the request accepted by the operation section, the display data indicated by the identification information contained in the field data to be written into the electronic paper.

BRIEF DESCRIPTION OF THE DRAWINGS

Exemplary embodiment(s) of the present invention will be described in detail based on the following figures, wherein

FIG. 3 is a diagram for explaining a content database according to the exemplary embodiment of the invention;

FIG. 4 is a diagram for explaining display data according to the exemplary embodiment of the invention;

FIG. 5 is a diagram for explaining field data according to the exemplary embodiment of the invention;

DETAILED DESCRIPTION

Figure 1:
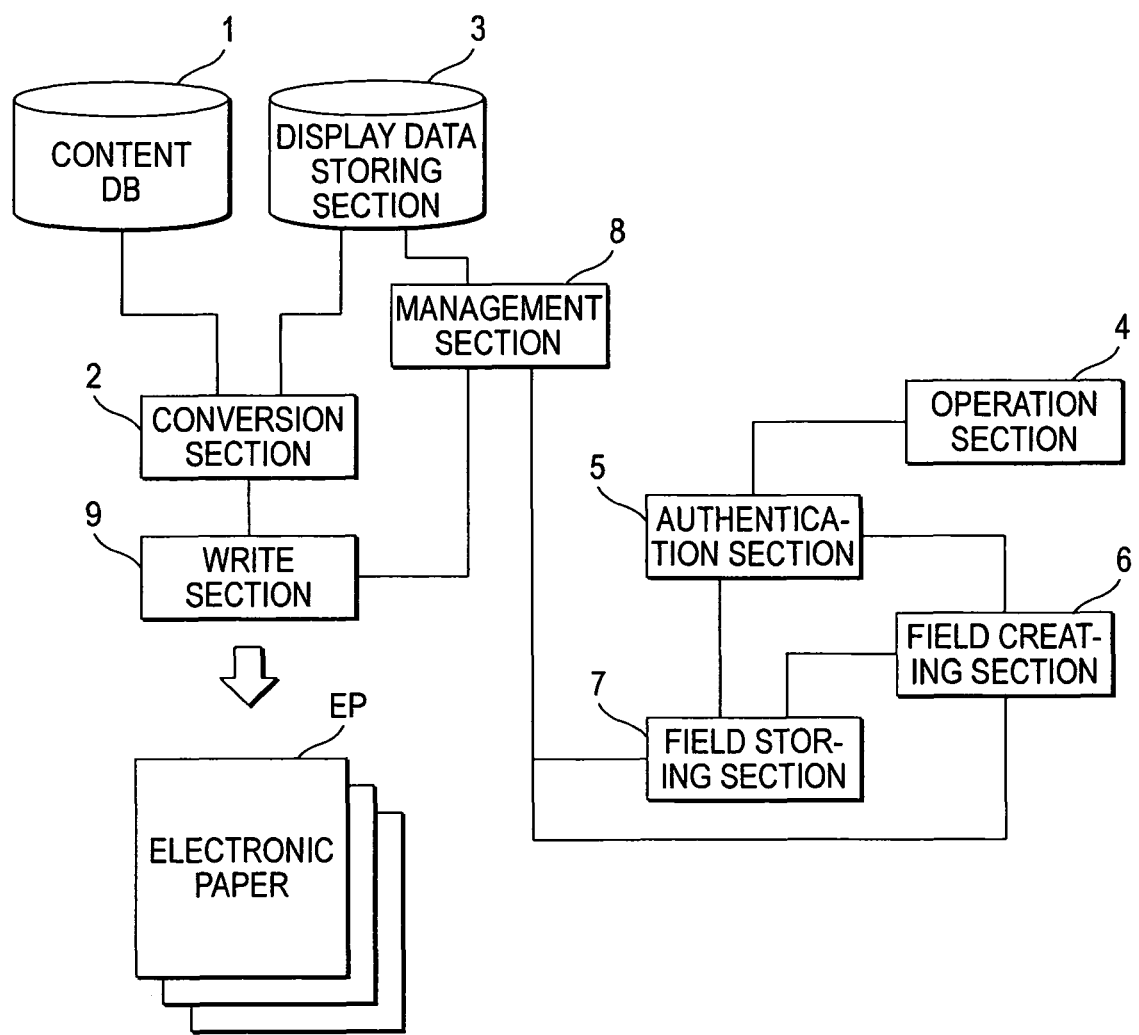
FIG. 1 is a block diagram of a content management system according to one exemplary embodiment of the invention.

A content management system according to an exemplary embodiment of the invention will be described.

First, electronic paper which is applicable to the content management system in this example will be described.

The electronic paper is divided in the form of writing a content image into various types. Herein, electronic write type electronic paper into which a content image is electronically written by a write device, and optical write type electronic paper into which a content image is written by projection by a write device will be described.

The electronic write type electronic paper is a flexible and thin medium having size such as A4-sized paper, and has a structure in which very fine colored particles (for example, white-colored particles and black-colored particles) utilized as toners in a copying machine are enclosed in between a pair of front and rear electrodes of which at least the front side is transparent, and the resulting laminated body is sandwiched in between a pair of front and rear film substrates of which at least the front side is transparent. Herein, an air layer is formed between the electrodes so that the colored particles can freely move. Further, the electrode layers arranged in the shape of a matrix are provided with insulating layers for preventing contact with the colored particles. Further, by using a color filter, color display can be also realized in a simple structure.

The electronic write type electronic paper operates in such a manner that: in a state where no voltage is applied to the electrodes, the white particles charged in minus gather on the rear side, whereas the black particles charged in plus gather on the front side, so that the electronic write type electrode paper falls into a black state when seen visually from the front side. Further, when a writing section (driver) of the writing device operates based on electronic data so as to invert the electrode polarities of the required parts of the matrix which correspond to an image to be displayed, the positional relation between the white particles and the black particles are replaced, and a content image which is based on the contrast between the white particles and the black particles is displayed. Further, by operating the driver of the write device on the basis of the different electronic data, the content image displayed on the basis of the contrast between the white particles and the black particles can be changed over, and the electronic write type electronic paper can be reused many times.

The optical write type electronic paper is a flexible and thin medium having size such as A4-sized paper. For example, in such a way that a content image to be written is displayed on a write section (liquid crystal panel) of a write device, and that the optical write type electronic paper is irradiated with light in superposition on the liquid crystal panel with a voltage applied to the write electrodes of the electronic paper from an external power source, the optical write electronic paper can transfer, display and store the content image displayed on the liquid crystal panel. Even after the voltage applied to the write electrodes has been removed, the optical write type electronic paper continues to retain the content image in a display state.

The optical write type electronic paper has a structure in which a layer of organic photoconductive material (organic photoconductive layer) utilized in a copying machine is combined with a layer of liquid-crystal display material (cholesteric liquid crystal layer put in the form of microcapsules), these layers are sandwiched in between a pair of front and rear transparent electrodes, and the resulting laminated body is sandwiched in between a pair of front and rear transparent substrate films. This configuration enables the monochromatic image display of a white display which is based on the reflection of light by the cholesteric liquid crystal layer, and a black display which is based on the transmission of light through the liquid crystal layer and the subsequent absorption of the light by a black layer that is interposed between the cholesteric liquid crystal layer and the organic photoconductive layer. Further, a cholesteric liquid crystal has the property that color light corresponding to a spiral pitch is reflected by interference. Therefore, color display can be realized by a simple structure in such a way that the cholesteric liquid crystal layer is configured by stacking liquid crystals of different spiral pitches.

The optical write type electronic paper, when the content image to be transferred to the liquid crystal panel of the write device is displayed and projected, and the voltage is applied to the write electrodes, converts the intensity of light into a reflection density in a moment and retains the projected image. Next, by applying an erase voltage to the write electrodes, the displayed and retained content image can be erased.

Figure 7A:
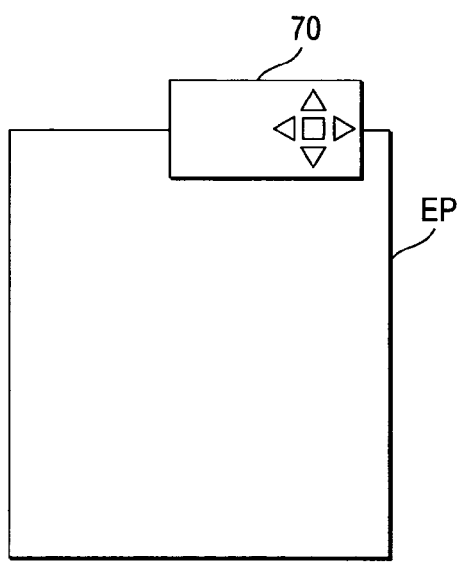
FIGS. 7A and 7B are diagrams for explaining electronic paper and a write device.
Figure 7B:
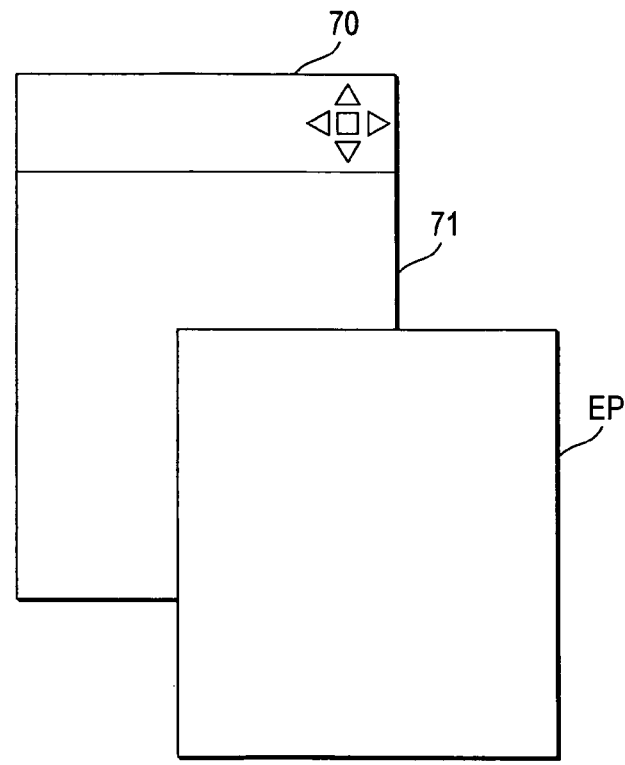

As the write device for writing a content image into the above-described electronic paper, there are, for example, write devices shown in FIGS. 7A and 7B.

A write device 70 shown in FIG. 7A is a type applied to the electronic write type electronic paper EP, which has a driver (write unit) connected to the electronic paper EP, and writes a content image based on electronic data (display image data which is suited to resolution of the electronic paper) into the electronic paper EP as described above.

Further, although this write device 70 may be provided integrally for the electronic paper EP, it may be detachably attached to the electronic paper EP.

A write device 70 shown in FIG. 7B is a type applied to the optical write type electronic paper, which has a display surface 71 that displays a content image thereon and projects the content image on the electronic paper EP, and which has a function of applying a voltage to the write electrodes provided in the electronic paper EP. As described above, the write device 70 projects a document image on the electronic paper EP placed on the display surface and writes the document image into the electronic paper EP.

In a content management system described later, either of the write device 70 applied to the electronic write type electronic paper EP and the write device 70 applied to the optical write type electronic paper EP may be used.

FIG. 1 shows configuration of the content management system according to this example.

The content management system includes a content database 1 which stores plural pieces of content data; a conversion section 2 which converts the content data stored in the content database 1 into display data for the electronic paper EP; a display data storing section 3 which stores the displaying data; an operation section 4 which accepts operation input from a user; an authentication section 5 which performs known authentication using a user ID or a password in accordance with the user's input; a field creating section 6 which creates field data including identification information of the user (user ID) belonging a field and identification information of displaying data (displaying data ID) based on the user input from the operation section 4; a field storing section 7 which stores the created field data; a management section 8 which refers to the field storing section 7 for the request including the user identification information from the operation section 4, and allows writing of displaying data in the field data under coincidence of the user identification information, into the electronic paper EP; and a write section 9 which writes a content image into the electronic paper EP based on the displaying data.

In this example, by a content management program executed by a computer, all or a part of the above sections 1 to 9 is configured.

Figure 2:
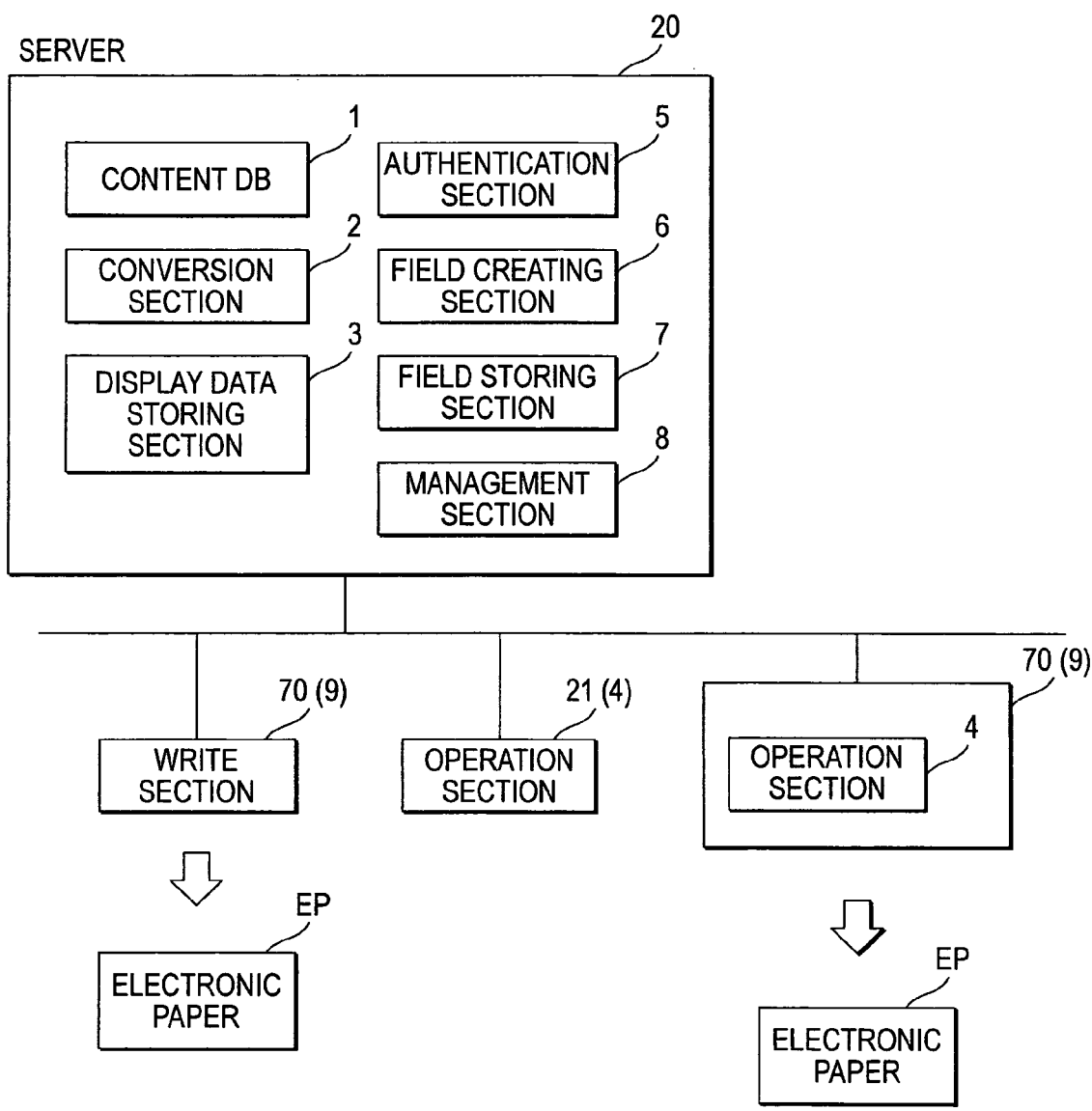
FIG. 2 is a diagram for explaining an example of a specified configuration of the content management system according to the exemplary embodiment of the invention.

Though the content management system may have the configuration in which each of the above sections 1 to 9 is provided in a single device, it may has the configuration in which the respective sections are dispersedly provided on a network 10 as shown in FIG. 2.

In the example shown in FIG. 2, the content database 1, the conversion section 2, the display data storing section 3, the authentication section 5, the field creating section 6, the field storing section 7, and the management section 8 are provided in a server 20 on the network 10; the write section 9 is provided in a write device 70 connected to the network 10; the operation section 4 is provided in an operation device (for example, a communication terminal such as a mobile telephone or a mobile computer) 21 connected to the network 10; and data communication is served among the server 20, the operation device 21, and the write device 70 through the network 10. In the example shown in FIG. 2, the write device 70 also includes the operation section 4.

Further, the content base data 1 and the display data storing section 3 may be provided in another server on the network 10. Thus, various configurations may be employed.

In the above content database 3, as shown in FIG. 3, a content data (actual data such as a text, an image, and a graphic) of many contents are stored, each of content data including identification information such as a content ID and a content name, and attribute information such as an owner of content and creation date and time.

Here, since a limit is set to access to the personally owned content in this example, the attribute information of the content data includes also a user ID and a password set for the owner so as to be used in a personal authentication processing described later. Namely, in this example, a conversion authorization information (owner information) is set in each content data to convert into display data, and as described later, the management section 8 permits the conversion section 2 to convert the corresponding content data into display data on condition of including the conversion authorization information based on the user ID accepted through the operation section 4.

Further, regarding the personally owned content data, the corresponding owner user has the conversion authorization information, and additionally, the conversion authorization information may be given to a specified user such as a manager. Namely, as a setting method of a right of opening the content to the public, various methods may be employed.

Accordingly, the user inputs a request including the identification information through the operation section 4, thereby to permit the conversion section 2 to read out data of the specified content and to carry out the conversion processing.

Further, in this example, authentication processing is performed, in which whether a user ID and a password input in the above request inputting time coincide with a user ID and a password which have been previously registered and retained in the authentication section 5 is confirmed, and only the request having the coincidence start the above read-out and conversion processing. Hereby, regarding the content data in which the user ID and the password have been set, only the owner of its content data causes the conversion section 2 to perform the conversion processing into displaying data. Namely, regarding the personally owned content, only the owner user has a right of converting its content into displaying data, and writing and displaying the converted displaying data into and on the electronic paper EP.

In the above displaying data storing section 3, as shown in FIG. 4, there are stored plural content display data converted into image data adapting to such as resolution of the electronic paper, each of the content display data including identification information such as a display data ID, a content name, and a content ID.

In the above field storing section 7, as shown in FIG. 5, plural field data are stored, each including, as information for specifying a field, a field ID for identifying each field, an owner ID which is an ID of a user as an organizer of its field, a user list including user ID's of members participating in the field, a content list including respective content data ID's which specify all the contents which are opened to the members participating in the field by the content display on the electronic paper, a display data list including respective displaying data ID's which specify all the contents which are opened to the members participating in the field by the display on the electronic paper, and a available period of the field.

The field data, based on input of necessary data through the operation section 4 by the user who is an owner, is created by the field creating section 6 and stored in the field storing section 7.

Namely, the user may form arbitrarily a field if necessary, may set arbitrarily one or more user as a member in its field, and can set arbitrarily one or more content to be used in its field.

Although the "user" in this example is treated as an individual, the "user" may be a user group which is a gathering of plural individuals in the invention, and a term of "user" in claims includes both meanings. In case that the "user" is treated as the user group, the user ID and the authentication processing are treated by a group unit to be applied to the invention.

Processing by the content management system in this example will be described.

First, in case that a field such as a meeting is formed, a user who is an organizer registers field data. The organizer user operates the operation section 4, receives the above authentication from the authentication section 5, and inputs necessary data as shown in FIG. 5. Correspondingly to this operation, the field creating section 6 creates field data and the created field data is stored in the field storing section 7.

Hereby, in the field organized by its user, an ID of the user participating in its field, and an ID of the content to be used in the field are registered.

Thereafter, the organizer user or the participator user operates the operation section 4, receives the above authentication from the authentication section 5, specifies the content set so as to be used in the field in which he participates, and gives an instruction of writing into the electronic paper. Then, the conversion section 2 reads out the content data from the content database 1 in accordance with its instruction and converts its read-out content data into display data. This display data is stored in the display data storing section 3 and sent to the write device 9, and the write device 9 writes contents images based on the display data into the specified number of sheets of electronic paper EP by the user.

Figure 6:
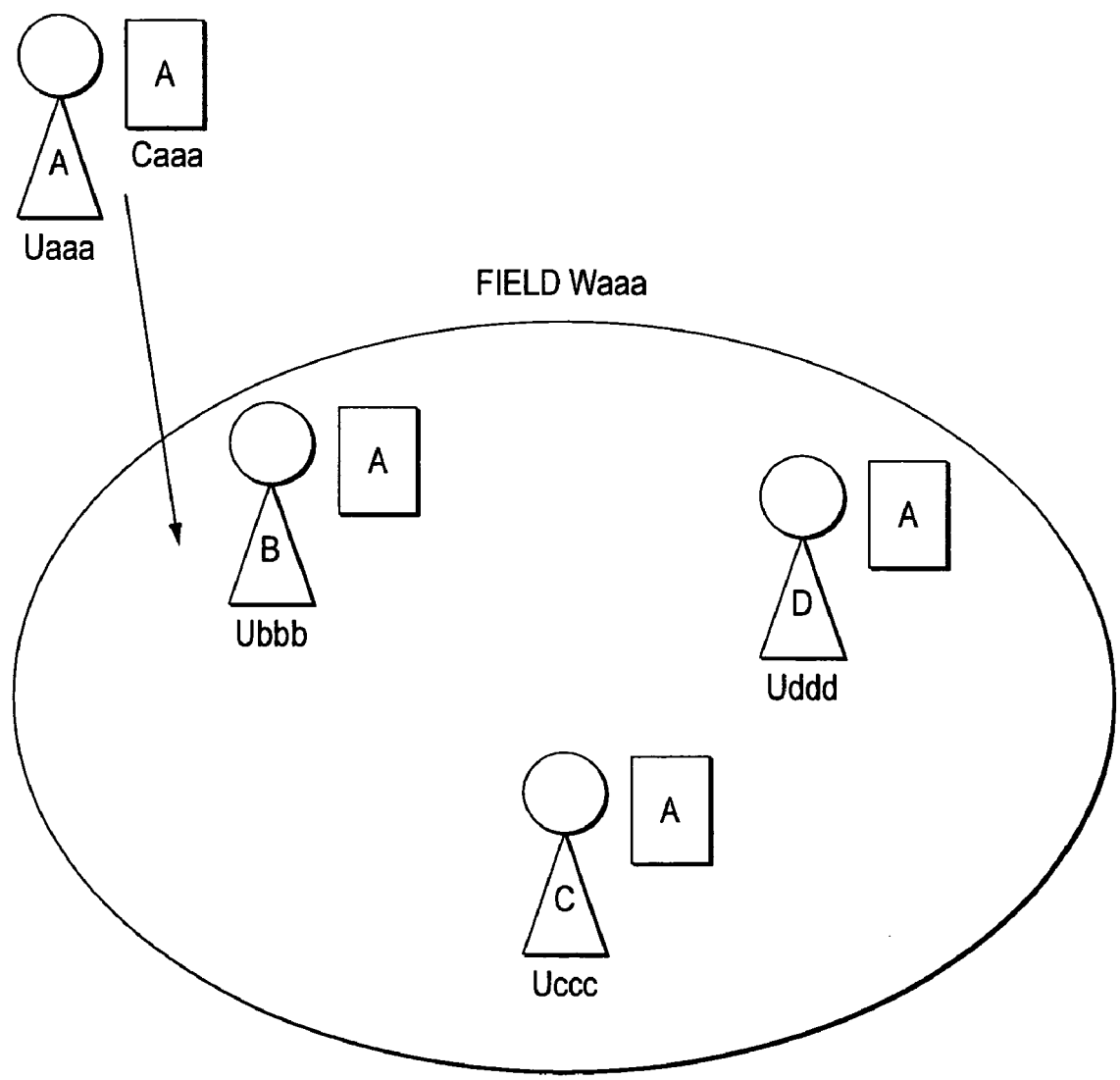
FIG. 6 is a diagram for explaining an example of the content management system according to the exemplary embodiment of the invention.

For example, as shown in FIG. 6, in case that four users A to D (user ID: Uaaa to Uddd) form a field of a meeting, and the user A uses his own content A in this meeting by means of the electronic paper, displaying data of the content A is stored and retained in the displaying data storing section 3 in accordance with this use, and managed in association with the ID's (Uaaa to Uddd) of the users participating in the meeting by the field data.

After the field has ended, that is, after the meeting has ended, when the user who has participated in this meeting operates the operation section 4, receives the above authentication from the authentication section 5, specifies the content used in the meeting from the content ID or the content name, and gives an instruction of writing the specified content into electronic paper, the management section 8, referring to the field storing section 7, judges whether or not the content in which the user data coinciding with the user ID inputted from the user in the authentication processing is specified is set in the set field data. In case that the coincidence exists, the management section 8 reads out the displaying data of the specified contents from the displaying data storing section 3 and inputs the read-out displaying data in the write section 9. The write section 9 writes and displays the content image based on the displaying data into and on electronic paper EP.

Accordingly, the content displayed on the electronic paper in order to be used in the field is stored and retained in the form of the displaying data so that the user who has participated in the field may display its content on the electronic paper later to browse the content. Hereby, the user who has participated in the field may browse the content again, and its content is retained as it is at that time even if the original content data is edited.

Further, the invention may be applied also to a field such as a task which one user performs. In this case, a participating member is one organizer user, and the content used in the field (task) which the user has already performed can be utilized to be browsed later by means of the electronic paper.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A content management system comprising:
   a conversion section that converts content data into display data which is to be written into an electronic paper, the electronic paper which displays and retains an image in a no-power state and is configured to rewrite the image;
   a display data storing section that stores the display data;
   a field storing section that stores field data which includes identification information of a first user belonging to a field and identification information of the display data;
   an operation section that accepts a request from a second user; and
   a management section that allows, when the identification information of the first user contained in the field data coincides with identification information of the second user contained in the request accepted by the operation section, the display data indicated by the identification information contained in the field data to be written into the electronic paper.

2. The content management system according to claim 1, further comprising:
   a writing section that writes a content image into the electronic paper based on the display data.

3. The content management system according to claim 1, further comprising:
   a content storing section that stores the content data.

4. The content management system according to claim 1, further comprising:
   a creating section that creates the field data to be stored in the field storing section.

5. The content management system according to claim 1, wherein
   the content data includes a conversion authorization information which has at least one of user information indicating an authorization to convert the content data into the display data by the conversion section; and
   the management section allows when the user information of the conversion authorization information indicates a user corresponding to the second user, the conversion section to convert the content data into display data.

6. A computer readable medium storing a program causing a computer to execute a process for managing content, the process comprising:
   converting content data into display data which is to be written into an electronic paper, the electronic paper which displays and retains an image in a no-power state and is configured to rewrite the image;
   storing the display data;
   storing field data which includes identification information of a first user belonging to a field and identification information of the display data;
   accepting a request from a second user; and
   allowing, when the identification information of the first user contained in the field data coincides with identification information of the second user contained in the accepted request, the display data indicated by the identification information contained in the field data to be written into the electronic paper.

* * * * *